US011139725B2

(12) United States Patent
Latulipe

(10) Patent No.: US 11,139,725 B2
(45) Date of Patent: Oct. 5, 2021

(54) MULTI-ROTOR ELECTRICAL MACHINE WITH RADIAL CONFIGURATION

(71) Applicant: PRATT & WHITNEY CANADA CORP., Longueuil (CA)

(72) Inventor: Eric Latulipe, Ste-Julie (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 69 days.

(21) Appl. No.: 16/516,501

(22) Filed: Jul. 19, 2019

(65) Prior Publication Data

US 2021/0021181 A1 Jan. 21, 2021

(51) Int. Cl.
*H02K 16/02* (2006.01)

(52) U.S. Cl.
CPC .................. *H02K 16/025* (2013.01)

(58) Field of Classification Search
CPC ............................ H02K 16/00; H02K 16/02
USPC ............................................ 310/83, 113, 114
See application file for complete search history.

(56) References Cited

U.S. PATENT DOCUMENTS

| 4,498,014 A * | 2/1985 | Reyes ............. F01D 15/10 290/1 A |
| 6,700,272 B1 | 3/2004 | Lindner |
| 6,998,757 B2 | 2/2006 | Seguchi et al. |
| 8,232,700 B2 | 7/2012 | Dooley |

\* cited by examiner

*Primary Examiner* — Quyen P Leung
*Assistant Examiner* — Minki Chang
(74) *Attorney, Agent, or Firm* — Norton Rose Fulbright Canada LLP

(57) ABSTRACT

The electric machine includes a plurality of rotors drivingly coupled to a common shaft defining a shaft axis about which the common shaft is rotatable, and a common stator for the plurality of rotors, the common stator extending circumferentially about the common shaft. The rotors are rotatable about respective rotor axes which are substantially perpendicular to the shaft axis.

18 Claims, 4 Drawing Sheets

MULTI-ROTOR ELECTRICAL MACHINE WITH RADIAL CONFIGURATION

TECHNICAL FIELD

The present disclosure relates generally to electric machines, and more particularly to multi-rotor electric machines such as motors and generators.

BACKGROUND

Electric machines with multiple rotors are known and may provide enhanced power over conventional electric machines. However, it is always desirable to improve the quality of the output torque characteristics and continuous improvement is sought for multiple rotor electric machines. Moreover, some multiple-rotor electric machines may experience durability challenges due to variability in torque at the rotor level during operation. Improvement of multi-rotor electric machines remains desirable, including but not exclusively in an effort to improve cooling and reduce axial dimensional envelopes.

SUMMARY

There is accordingly provided an electric machine comprising a plurality of rotors drivingly coupled to a common shaft defining a shaft axis about which the common shaft is rotatable, a common stator for the plurality of rotors, the common stator extending circumferentially about the common shaft, the rotors rotatable about respective rotor axes, the rotor axes of the rotors being substantially perpendicular to the shaft axis.

There is also provided an electric motor comprising a plurality of bi-pole magnetized rotors configured to drive a common output shaft rotatable about a common shaft axis, the rotors rotatable about respective rotor axes that are substantially perpendicular to the common shaft axis, one or more common stators each having windings circumferentially spaced apart thereon, the rotors indexed relative to each other such that when a current is passed through the windings, the rotors provide rotary power to the common output shaft.

There is further provided an electric generator comprising a plurality of bi-pole magnetized rotors configured to be driven by a common input shaft rotatable about a common shaft axis, the rotors rotatable about respective rotor axes that are substantially perpendicular to the common shaft axis, one or more common stators each having windings circumferentially spaced apart thereon, the rotors indexed relative to each other such that when torque is applied to the common input shaft, the rotors rotate about the rotor axes and electric current is generated in the windings.

Embodiments can include combinations of the above features.

Other features will become apparent from the drawings in conjunction with the following description.

DETAILED DESCRIPTION

The disclosure provides electric machines, and in particular multiple-rotor electric machines such as motors and generators. In some embodiments, the machines described herein may provide improved operational characteristics and durability, while maintaining relatively small axis dimensions. The relatively large front area (compared to most multi-rotor electric machines) of the present electric machines may also enable improved cooling.

In various aspects, the disclosure provides electric motors and generators (collectively, "electric machines" as referred to herein) having a plurality of magnetized rotors, which may include or be in the form of single bi-pole magnets (i.e., two-pole rotors). The rotors are configured to drive (in the case of a motor) and/or be driven by (in the case of a generator) a common shaft, for example by suitable combinations and configurations of gears.

Various aspects of preferred embodiments of electric machines according to the disclosure are described herein with reference to the drawings.

Electric machines may have more than one rotor. An example of a multi-rotor electric machine is provided in U.S. Pat. No. 8,232,700 B2, the contents of which are hereby incorporated by reference in their entirety.

Figure 1:
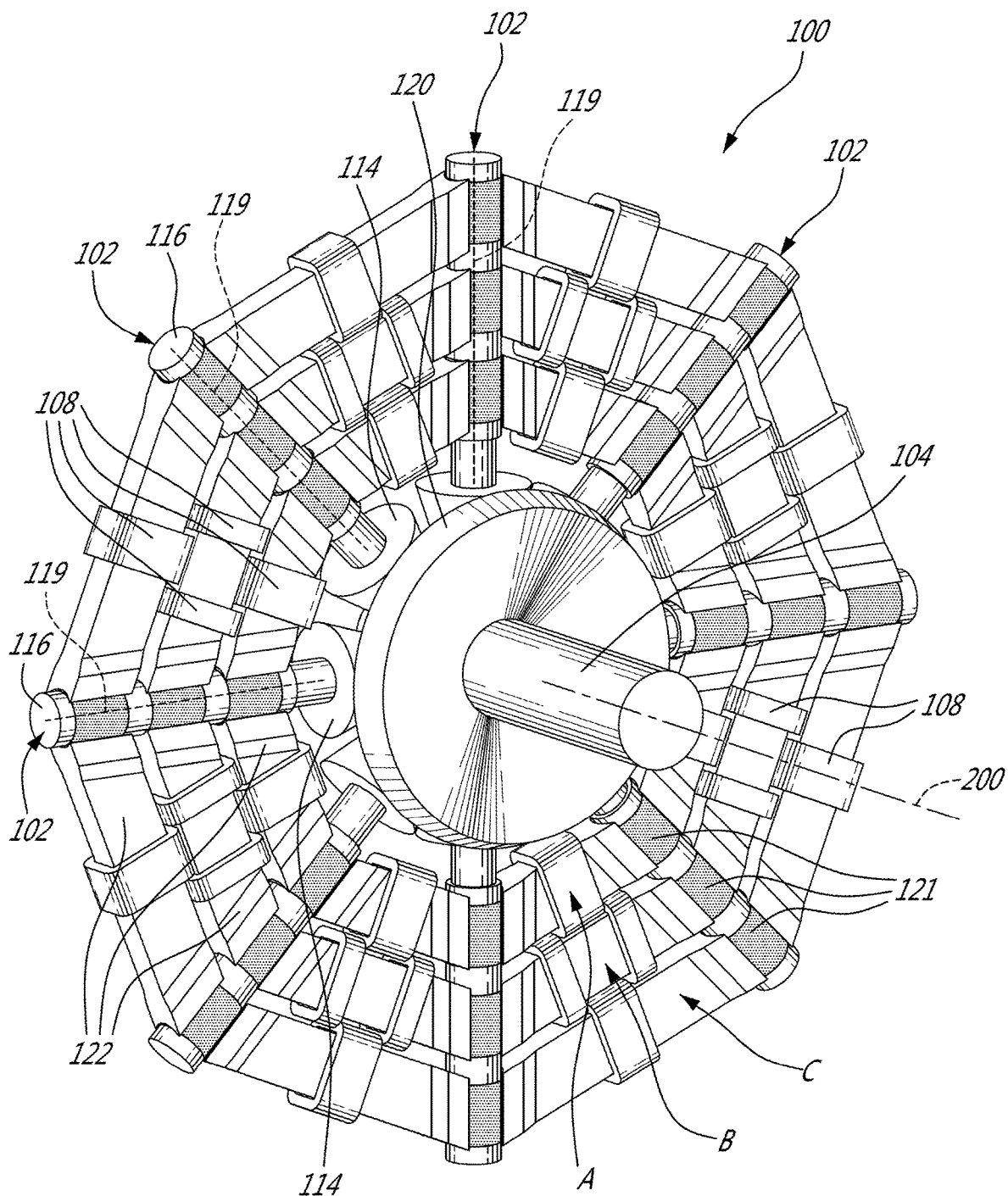
FIG. 1 is a perspective view of portions of an exemplary electric machine of the present disclosure having multiple rotors.

Referring now to FIG. 1, an electric machine 100 having multiple rotors 102 is described, and may therefore also be referred to herein generally as a "multi-rotor electric machine". As illustrated in FIG. 1, the electric machine 100 comprises magnetic rotors 102, windings 108, one or more shared stators 122, and a common shaft 104. The shaft 104 defines a shaft axis 200 extending therethrough and about which the shaft 104 rotates, and is centrally located relative to the plurality of rotors 102.

The machine 100 comprises a plurality of the magnetic rotors 102, each configured to rotate about a respective rotor axis 119 defined by an independent rotor shaft 116 on which is mounted magnets 121. The rotors 102 may be bi-pole magnetized rotors.

Figure 3:
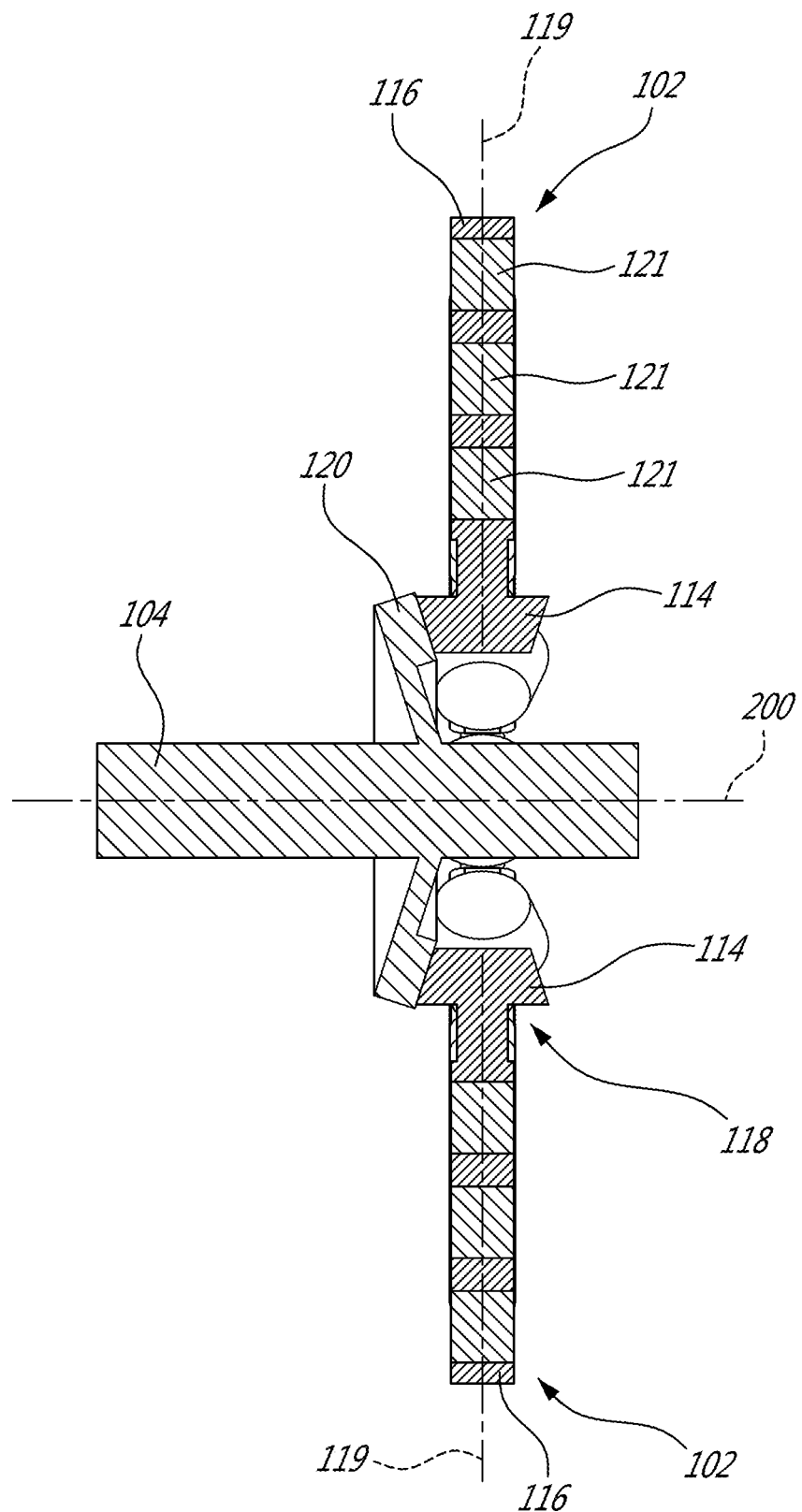
FIG. 3 is a cross-sectional view of portions of the electric machine of FIG. 1, taken through line A-A in FIG. 2.

As can be seen in FIG. 1, each of the rotors 102 of the electric machine 100 is disposed transverse (i.e. not parallel) to the shaft 104, and in the depicted embodiment, the rotor shafts 116 and thus the rotors 102 are oriented substantially perpendicularly to the shaft 104. The rotor axes 119 of the rotors 102 are therefore oriented substantially perpendicularly to the shaft axis 200 of the machine's common shaft 104, as best seen in FIG. 3 for example. The term "substantially perpendicularly" as defined herein with respect to the relative orientation of the rotor axes 119 (and thus the rotors 102) relative to the shaft axis 200 (and thus the shaft 104) is understood to be about 90 degrees, but may include a relatively minor variation (e.g. ±5%) away from 90 degrees exactly. This small variation may be the result for example of manufacturing tolerances, shaft concentricity, bearing tolerances, and the like. Regardless, the rotors 102 are disposed substantially perpendicularly relative to the common shaft 104 of the electric machine 100. Stated differently, the rotors 102 all lie in a common plane that is itself substantially perpendicular (i.e. normal) to the shaft axis 200 of the shaft 104.

Figure 2:
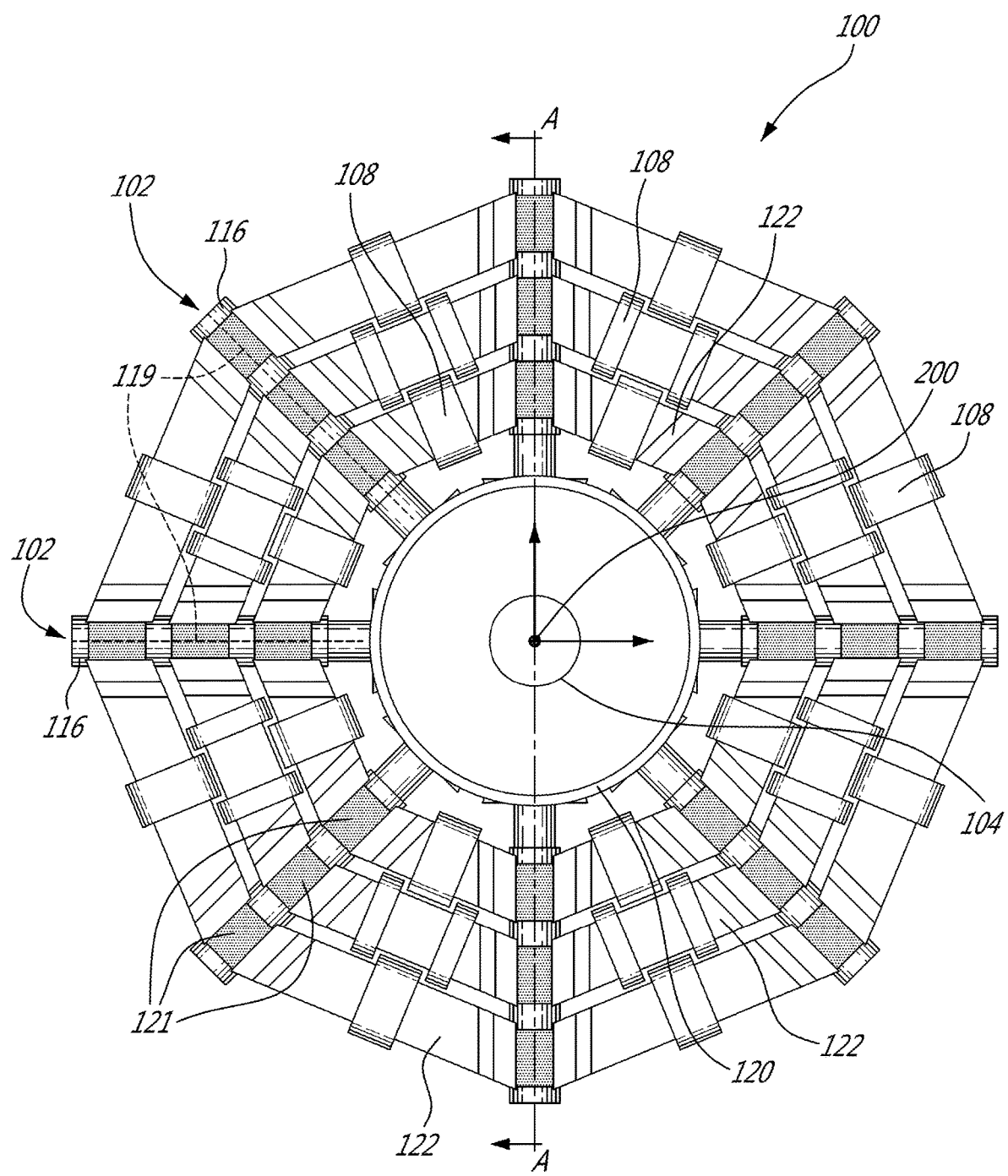
FIG. 2 is a front cut-away view of portions of the electric machine of FIG. 1.

In a particular embodiment, as depicted in FIGS. 1-2 for example, the rotors 102 are also arranged in a radial array, wherein the rotors 102 are circumferentially spaced apart about the center shaft 104 and each extends substantially radially away from the common shaft 104. Accordingly, the rotor axes 119 of the rotors 102 extend substantially radially relative to the shaft axis 200. The radially disposed rotors 102 therefor define a radial rotor array, all lying within a common plane.

It is however to be understood that in another embodiment, the rotors 102 may not be radially extending, while their rotor axes 119 still remain substantially perpendicular to the shaft axis 200 of the shaft 104. For example, the rotors 102 may be circumferentially skewed and in one particular embodiment the rotors may be tangentially disposed about the shaft 104, and therefore about the common shaft gear 120 as will be described further below.

Accordingly, unlike prior multi-rotor electric machines, which typically have a plurality or rotors disposed parallel to the common output shaft, the rotors 102 of the present electric machine 100 are all oriented such that the rotor axes 119 are substantially perpendicular to the shaft axis 200 of the common shaft 104. The present electric machine 100 is as a result axially narrower, but radially larger. Due to the larger radial dimension of the machine 100, a large frontal area is provided which may help to ease cooling of the machine. Further, the small axial dimension means that the machine may be fit within a much narrower (axially) space envelope, which may be desirable in some situations.

Although a single electric machine 100 is depicted in FIGS. 1-3, it is to be understood that an assembly of multiple electric machines 100 may also be provided. For example, a "stack" of multiple separate electric machines 100 may be provided about a common shaft. In a particular embodiment, each electric machine 100 in the stack defines a plane, and all of the planes may be substantially parallel to one another (and substantially perpendicular to the common shaft and the shaft axis).

As noted above, the electric machine 100 includes a common stator 122 (or multiple stators 122) each of which extends circumferentially about the common shaft 104. When so arranged, the stators 122 therefore form concentric annular stator rings, each for a different phase. Each rotor 102 includes a magnet 121 thereon that is radially aligned with its respective circumferential stator 122. The radially extending rotor shafts 116 therefore connect rotor magnets of different phases.

Referring still to FIGS. 1 and 3, in order to transmit torque between the plurality of radially disposed rotors 102 and the common shaft 104, each of the rotors 102 includes a rotor gear 114 on its radially inner end 118 that is in meshed engagement with a cooperating common shaft gear 120. In the depicted embodiment, both the rotor gear 114 on each rotor 102 and the common shaft gear 120 are bevel gears, which cooperate to transmit torque between the radially oriented rotors 102 and the axially oriented shaft 104. Alternate gear systems may however also be used, including the embodiment as described below with reference to FIG. 4. In the present embodiment, the bevel gears 114 and 120 are respectively integrally formed with the rotor shaft 116 and the machine shaft 104. Although not depicted, each of the rotors 102 may also be supported for rotation within suitable bearings.

As seen in FIGS. 1 and 2, in the embodiment shown, the electric machine 100 includes eight rotors 102 and three phases, as defined by the radially concentric stators 122 and windings 108. More specifically, in the depicted embodiment for example, the radially inner "ring" defined by the a first circumferentially-arranged set of stators 122 and windings 108 defines Phase A, the radially middle "ring" defined by a second circumferentially-arranged set of stators 122 and windings 108 defines Phase B, and the radially outermost "ring" defined by a third circumferentially-arranged set of stators 122 and windings 108 defines Phase C. It is however to be understood that fewer or more phases may alternately be used.

As will be understood be one skilled in the art, when machine 100 is operated as a motor and an electric current is applied to windings 108, each rotor shaft 116 is configured to, under the impetus of magnetic rotors 102, drive the common shaft 104 via gears rotor gears 114 and the central gear 120. Alternatively, when a torque is applied to shaft 104 such that machine 100 acts as a generator, the magnetic rotors 102 are driven by the shaft 104 such that they rotate about their respective rotor axes 119, and thus cause the flow of electric current in windings 108. It should be appreciated that the gears are shown in the figures without teeth solely for the sake of clarity. The gears may be provided in any suitable form, including, for example, toothless wheels engaged by friction to transmit torque therebetween.

In the illustrative arrangement shown in FIGS. 1 to 3, and when the electric machine is operated as an electric motor, each rotor gear 114 engages the periphery of central or ring gear 120 of the shaft 104, so that total torque applied to central gear 120 is the sum of the torques applied by the rotor gears 114 driven by the rotors 102. As will be readily understood by those skilled in the relevant arts, if the winding(s) 108 are configured substantially circumferentially about axis 200 of shaft 104 and therefore machine 100, a suitable arrangement of rotors 102 and/or gears 114, suitable index angles may be set at desired values for individual rotors, and sets thereof, with the result that phased torque output applied by each pair of rotors 102 can be applied to provide smooth, continuous, and very powerful torque to shaft 104, in the case of motor operation; or, in the case of generator operation, very smooth and continuous current output from overall winding(s) 108.

Each of the rotors 102 herein may comprises one or more magnets 121 mounted on their respective rotor shafts 116 and retained, particularly when rotating, by a suitable containment sheath. The magnets may comprise north and south poles. In some embodiments, rotors 102 are bi-pole rotors (i.e. rotors having bi-pole magnets mounted thereon). In some embodiments, rotors 102 are grouped in pairs and indexed relative to each other such that the magnets are mounted, and rotate, (a) as individual rotors 102, in a desired phase with respect to their pair mates, and (b) by pairs, in a desired paired phase with respect to other pairs and winding (s) 108. Advantages associated with this configuration are explained in U.S. Pat. No. 8,232,700, the contents of which are incorporated by reference.

In some embodiments, therefore the rotors may be magnetically indexed, in pairs, with respect to each other and to corresponding electrical windings such that, when a current is passed through the one or more windings, the rotors provide phased rotary power to the common shaft (i.e. in the case of an electric motor). Alternatively, when torque is applied to the common shaft or gears connected thereto, a phased electrical output may be provided to the windings (i.e. in the case of an electric generator).

Windings 108 may be provided in any configuration suitable for use in accomplishing the purposes described herein. For example, single Litz wire or multiple strand windings 108 may be used in configuring the machine 100, individual rotors 102, rotors pairs, or other desired sets of rotors 102. The use of multiple windings 108 in a machine 100 can be used, as for example in conjunction with suitable mechanical indexing of the rotors 102 to fully or partially provide desired phasings in torque applied by rotors 102 to shaft or load. For example, 3-phase windings used in known electric machines may be formed by appropriate interconnections of the separate windings in machines 100 according to the present disclosure.

As depicted, each rotor gear 114 engages the periphery of the common central gear 120 such that total torque applied to common central gear 120 is the sum of the torques applied by the rotor gears 114. If winding(s) 108 are configured substantially circumferentially about axis 200 of the shaft 104 and therefore machine 100, an index angle may be defined between equators (that is, the line dividing magnet into north and south halves) of individual magnets 128 and radii 204 extending from axis 200 to the corresponding rotor 102. By suitable arrangement of rotors 102 and/or gears 118, index angles may be set at desired values for individual rotors, and sets thereof, with the result that phased torque output applied by each of the rotors can be applied to provide smooth, continuous torque to shaft 104, when operated as a motor. When operated as a generator, smooth and continuous current may be output from overall winding (s) 108.

In the embodiment of FIGS. 1-3, the electric machine 100 (whether configured to operate as an electric motor or an electric generator), generally has 8 rotors and 3 phases (and 3 common, circumferential stators). It is to be understood however that other combinations are possible, whereby this embodiment can be readily adapted to have fewer or more rotors, and to provide fewer or more phase systems.

Figure 4:
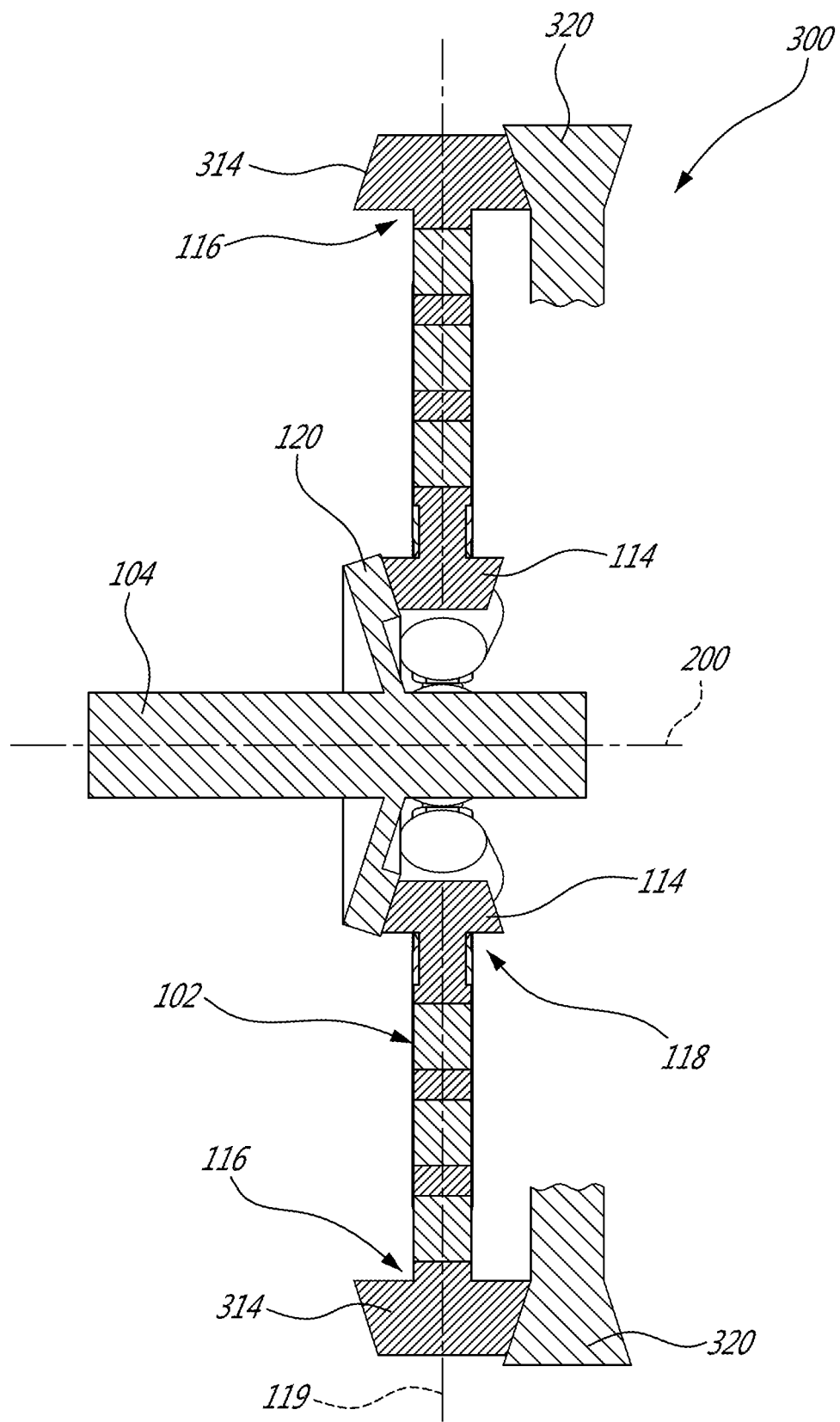
FIG. 4 is a schematic cross-sectional view taken through rotors of an alternate electric machine of the present disclosure.

Referring now to FIG. 4, an electric machine 300 in accordance with an alternate embodiment is shown. The electric machine 300 is similar to the electric machine 100 as described above, with the exception of additional gears, as will be described. Unless otherwise indicated, however, the electric machine 300 corresponds to that depicted and described in FIGS. 1-3, and therefore similar reference numbers have been used in FIG. 4 and are understood to correspond to the elements described above in the context of the electric machine 100.

As is the case for electric machine 100, the electric machine 300 is configured to transmit torque between the plurality of rotors 102 and the common shaft 104. Each of the rotors 102 includes a first, radially inner, rotor gear 114 disposed on its radially inner end 118 that is in meshed engagement with a cooperating common shaft gear 120, which is itself either integral with or mounted to the common shaft 104. In the depicted embodiment, both the rotor gear 114 on each rotor 102 and the common shaft gear 120 are bevel gears, which cooperate to transmit torque between the rotors 102 and the axially oriented shaft 104. In the electric machine 300, each of the rotors 102 also includes a second, radially outer, rotor gear 314 located on its radially outer end 116. Much like the first rotor gears 114, the second rotor gears 314 are either integrally formed with or mounted to the rotors 102 such that they rotate together about the respective rotor axes 119. The radially outer second rotor gears 314 are disposed in gear meshing engagement with one or more other gears, such as to transmit torque thereto. Accordingly, the radially outer second rotor gears 314 may be used to further transmit torque to elements external to the electric machine 300 itself, such as for example one or more other gears. In the embodiment of FIG. 4, the radially outer second rotor gears 314 are in meshed engagement with a common outer ring gear 320, which rotates for example about an axis concentric with the shaft axis 200 of the common shaft 104. The electric machine 300 of this configuration may according be used, for example, as part of a reduction gearbox. Alternately, the radially outer second rotor gears 314 may be used to transmit torque to elements.

In one embodiment, therefore, the presently described electric machine includes a plurality of rotors drivingly coupled to a common shaft defining a shaft axis, the rotors being rotatable about respective rotor axes that are substantially perpendicular to the shaft axis. The rotors may extend radially relative to the common shaft. Each of the rotors may include a radially extending rotor shaft having a rotor gear disposed on a radially inner end thereof, the rotor gear being in meshed engagement with a cooperating central shaft gear of the common shaft to thereby transmit torque therebetween. The rotor gear and the central shaft gear may be bevel gears. The rotors may be equally circumferentially spaced apart about the common shaft. A common stator may be provided for the plurality of rotors, the common stator extending circumferentially about the common shaft and having windings circumferentially spaced apart on the common stator. The number of stators may be less than the number of rotors. Two or more common stators may be provided for the plurality of rotors, the two or more common stators being concentric and each extending circumferentially about the common shaft and having windings circumferentially spaced apart thereon. The rotors may include bi-pole magnets radially aligned with each of the common stators. Each of the two or more stators may define a phase of the electric machine. The electric machine may comprise three phases. The windings on radially adjacent ones of the common stators may be circumferentially offset from each other. Each of the stators may include one or more of the windings between circumferentially adjacent pairs of the rotors. The rotor axes may all lie in a common plane, the common plane being normal to the shaft axis.

In another embodiment, the presently described electric motor includes a plurality of bi-pole magnetized rotors configured to drive a common output shaft rotatable about a central shaft axis, the rotors being rotatable about respective rotor axes that are substantially perpendicular to the central shaft axis. One or more common stators are provided, each having windings circumferentially spaced apart thereon. The rotors are indexed relative to each other such that when a current is passed through the windings, the rotors provide rotary power to the common output shaft. The rotors may be oriented radially relative to the common output shaft. Each of the one or more common stators may extend circumferentially about the common output shaft In another embodiment, the presently described electric generator includes a plurality of bi-pole magnetized rotors configured to be driven by a common input shaft rotatable about a central shaft axis, the rotors being rotatable about respective rotor axes that are substantially perpendicular to the central shaft axis. One or more common stators are provided, each having windings circumferentially spaced apart thereon. The rotors are indexed relative to each other such that when torque is applied to the common input shaft, the rotors rotate about the rotor axes and electric current is generated in the windings. The rotors may be oriented radially relative to the common output shaft. Each of the one or more common stators may extend circumferentially about the common input shaft.

The above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. An electric machine comprising rotors drivingly coupled to a common shaft defining a shaft axis about which the common shaft is rotatable, two or more common stators for the rotors, the two or more common stators extending circumferentially between the rotors and being concentric with each other about the common shaft to form concentric annular stator rings, the rotors rotatable about respective rotor axes, the rotor axes of the rotors lying in a common plane that is substantially perpendicular to the shaft axis, each of the two or more common stators having windings disposed circumferentially between the rotors within said plane.

2. The electric machine of claim 1, wherein the common shaft is located centrally relative to the rotors, and the rotors extend radially relative to the common shaft and the shaft axis.

3. The electric machine of claim 2, wherein each of the rotors includes a radially extending rotor shaft having a rotor gear disposed on a radially inner end thereof, the rotor gear in meshed engagement with a cooperating common shaft gear of the common shaft to thereby transmit torque therebetween.

4. The electric machine of claim 3, wherein the rotor gear and the common shaft gear are bevel gears.

5. The electric machine of claim 1, wherein the rotors are equally circumferentially spaced apart about the common shaft.

6. The electric machine of claim 1, wherein the windings are circumferentially spaced apart about each of the two or more common stators.

7. The electric machine of claim 1, wherein a number of stators is less than a number of the rotors.

8. The electric machine of claim 1, wherein the rotors include bi-pole magnets radially aligned with each of the two or more common stators.

9. The electric machine of claim 1, wherein each of the two or more common stators defines a phase of the electric machine.

10. The electric machine of claim 9, wherein the electric machine comprises three phases.

11. The electric machine of claim 1, wherein the windings on radially adjacent ones of the two or more common stators are circumferentially offset from each other.

12. The electric machine of claim 1, wherein each of the stators includes one or more of the windings between circumferentially adjacent pairs of the rotors.

13. An electric motor comprising a plurality of bi-pole magnetized rotors configured to drive a common output shaft rotatable about a common shaft axis, the rotors rotatable about respective rotor axes that are substantially perpendicular to the common shaft axis, two or more common stators concentrically arranged and extending circumferentially about the common output shaft to form concentric annular stator rings, each of the two or more common stators having windings circumferentially spaced apart thereon, the windings being disposed circumferentially between the rotors, the rotors indexed relative to each other such that when a current is passed through the windings, the rotors provide rotary power to the common output shaft.

14. The electric motor of claim 13, wherein the rotors are oriented radially relative to the common output shaft.

15. The electric motor of claim 13, wherein the windings on radially adjacent ones of the two or more common stators are circumferentially offset from each other.

16. An electric generator comprising a plurality of bi-pole magnetized rotors configured to be driven by a common input shaft rotatable about a common shaft axis, the rotors rotatable about respective rotor axes that are substantially perpendicular to the common shaft axis, two or more common stators concentrically arranged and extending circumferentially about the common input shaft to form concentric annular stator rings, each of the two or more common stators having windings circumferentially spaced apart thereon, the windings being disposed circumferentially between the rotors, the rotors indexed relative to each other such that when torque is applied to the common input shaft, the rotors rotate about the rotor axes and electric current is generated in the windings.

17. The electric generator of claim 16, wherein the rotors are oriented radially relative to the common output input shaft.

18. The electric generator of claim 16, wherein the windings on radially adjacent ones of the two or more common stators are circumferentially offset from each other.

* * * * *